E. C. SEAMAN.

Ice Cream Freezer.

No. 226. Reissued Nov. 30, 1852.

N. PETERS, Photo-Lithographer, Washington, D. C.

UNITED STATES PATENT OFFICE.

EBER C. SEAMAN, OF PHILADELPHIA, PENNSYLVANIA.

IMPROVEMENT IN CREAM-FREEZERS.

Specification forming part of Letters Patent No. 5,821, dated October 3, 1848; antedated April 3, 1848: Reissue No. 226, dated November 30, 1852.

*To all whom it may concern:*

Be it known that I, EBER C. SEAMAN, of the city and county of Philadelphia, and State of Pennsylvania, have invented certain new and useful Improvements in the Apparatus for Freezing Cream; and I do hereby declare the following is a full, clear, and exact description of the construction and operation of the same, reference being had to the annexed drawings, making a part of this specification, in which—

Figure 2:
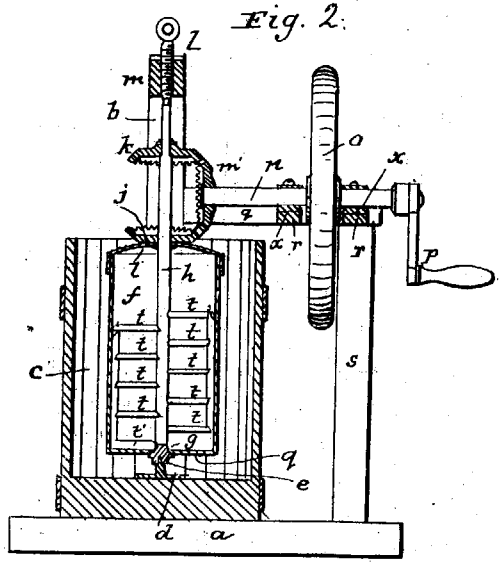
Figure 1:
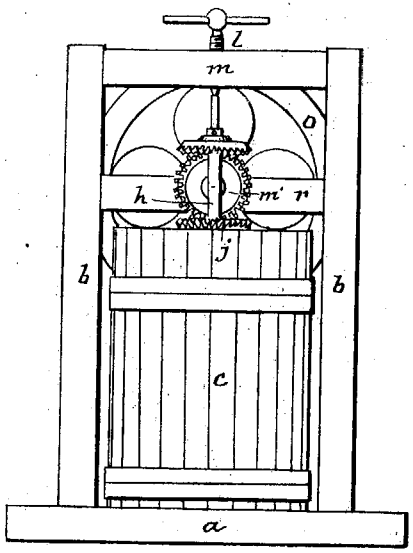

Figure 1 is a geometrical projection of the complete apparatus; and Fig. 2 is a vertical section of the same, showing the interior of the can with the improvements claimed.

On a platform, *a*, between two posts, *b*, the tub *c* is placed. Centrally on the bottom of said tub is fastened a step or gudgeon, *d*, on which a corresponding gudgeon or gudgeon-box, *e*, fastened to the under side of the can *f*, sets. On the bottom *y* of the can *f*, in its center, there is another step, *g*, which receives the lower extremity of the vertical shaft *h*. This shaft passes through the lid *i* of the can and through the center of a bevel cog wheel, *j*, fastened to the top said lid. A short distance above the cog-wheel *j* there is another similar one, *k*, and the extremity of the shaft above it is held in its place by means of a screw, *l*, which passes vertically through the cross-piece *m*, connecting the posts *b* and its conical point entering a corresponding cavity in the upper end of said shaft. Back of this shaft is a third, but vertical, bevel cog-wheel *m*, the cogs of which mesh in those of both the other wheels. This last named cog-wheel is fastened to a horizontal shaft, *n*, which extends backward and rests or works in metal boxes *x*. On said shaft is a fly or balance wheel, *o*, and on its back extremity is a crank and handle, *p*. The whole is fixed in an appropriate frame-work, *q*, *r*, and *s*. It will readily be perceived that, in consequence of the well-known manner of gearing, the can will revolve in one direction, while the shaft *h*, with its appendages, inside of said can, rotates in an opposite one. The appendages just now mentioned, and which constitute the distinguishing features of the improvements claimed, consist in a series of horizontal dashers, *t*, which are placed equidistant over each other on alternate sides of the shaft *h*, into which one end of each of them is fastened, excepting the lowest one, *t'*, which is wider than the rest, and the tenon or gudgeon of which plays freely in its corresponding perforation in the shaft. The permanent dashers are in shape similar to the blade of a knife, and they are placed on the shaft in such a manner that if the surface-lines were continued gradually around the shaft, and thus connected together, a perfect spiral line would be the result. Each upper and lower dasher has at or near its outer extremity a perforation or hole, in which the upper and lower gudgeon of a vertical scraper, *u*, plays. These scrapers are also similar to knife or sword blades, and serve to detach or scrape off the frozen or freezing cream from the surface of the can, the general bulk of the cream forcing their edges close to the can in consequence of the shaft, with the dashers and scrapers, revolving in an opposite direction to the can. What the scrapers *u* do for the inner vertical surface of the can the lowest dasher or scraper, *t'*, effects for the bottom surface. The other dashers serve to raise the cream, which when up to its utmost height descends again by its own gravity, and thus a continual displacing of the cream is effected, and thereby the process of freezing accelerated.

The side and bottom scrapers, for scraping off the frozen cream from the sides and bottom of the can and throwing it toward the center and upward, leaving the unfrozen cream to take its place, may be made to work with sockets, pivots, hinges, or their equivalents, or in any position which inclines them to self pressure, whether either the scrapers or can or both of them revolve.

The beaters or dashers standing on any angle may be made to have any similar position so as to raise the cream toward the top, and may be used on one side only or both.

What I claim as my invention, and desire to secure by Letters Patent, is—

The arrangement of scrapers *t'* and *u* at an angle with the bottom and sides of the vessel, as described, so that the action of the rotation shall throw the scapers against the sides and bottom of the vessel.

E. C. SEAMEN.

Witnesses:
GEO. PATTEN,
AUG. HOWSE.